US012688681B2

(12) United States Patent
Cornelio et al.

(10) Patent No.: US 12,688,681 B2
(45) Date of Patent: Jul. 21, 2026

(54) METHOD AND APPARATUS FOR CORRECTING ERRORS IN OUTPUTS OF MACHINE LEARNING MODELS

(71) Applicant: SAMSUNG ELECTRONICS CO., LTD., Suwon-si (KR)

(72) Inventors: Cristina Cornelio, Milton Keynes (GB); Timothy Hospedales, London (GB); Jan Stuehmer, Heidelberg (DE)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 18/376,660

(22) Filed: Oct. 4, 2023

(65) Prior Publication Data

US 2024/0119712 A1 Apr. 11, 2024

Related U.S. Application Data

(63) Continuation of application No. PCT/KR2023/011351, filed on Aug. 2, 2023.

(30) Foreign Application Priority Data

Sep. 28, 2022 (GB) .................................. 2214162.6
Mar. 21, 2023 (EP) .................................. 23163238

(51) Int. Cl.
*G06V 10/776* (2022.01)
*G06V 10/77* (2022.01)

(52) U.S. Cl.
CPC ........ *G06V 10/776* (2022.01); *G06V 10/7715* (2022.01)

(58) Field of Classification Search
CPC ...... G06V 10/776; G06V 10/70; G06V 10/82; G06V 10/7715; G06V 10/77; G06V 10/86;
(Continued)

(56) References Cited

U.S. PATENT DOCUMENTS 6,373,905 B1 4/2002 Yasuda et al.
2016/0091920 A1 3/2016 Belogolovy
(Continued)

FOREIGN PATENT DOCUMENTS

CN 112420148 A 2/2021
CN 113255331 B 11/2021
(Continued)

OTHER PUBLICATIONS

International Search Report and Written Opinion (PCT/ISA/210 and PCT/ISA/237) dated Nov. 20, 2023, issued by International Searching Authority for International Application No. PCT/KR2023/011351.
(Continued)

*Primary Examiner* — Sumati Lefkowitz
*Assistant Examiner* — Michael Adam Shariff
(74) *Attorney, Agent, or Firm* — Sughrue Mion, PLLC

(57) ABSTRACT

Broadly speaking, embodiments of the present techniques provide a method for reducing errors in the outputs of machine learning, ML, models on a potential output of the models to resolve any inconsistencies before outputting a final result from the models. The final result respects a set of rules or constraints, which may include logical constraints. Advantageously, this reduces the risk of a model outputting a result which violates some rules associated with the overall task of the model, which could be dangerous or provide a poor user experience.

20 Claims, 14 Drawing Sheets

(58) Field of Classification Search
CPC .......... G06V 10/84; G06N 20/00; G06N 3/02;
G06N 3/0464; G06N 3/045; G06T
2207/20084; G06T 7/162; G06T
2207/20072
See application file for complete search history.

(56) References Cited

U.S. PATENT DOCUMENTS

| | | | |
|---|---|---|---|
| 2021/0133580 A1* | 5/2021 | Mehl ...................... | G06N 3/084 |
| 2022/0126445 A1* | 4/2022 | Zhu .......................... | G06N 3/08 |
| 2022/0138559 A1 | 5/2022 | Gangi Reddy et al. | |
| 2022/0180166 A1 | 6/2022 | Wachi et al. | |
| 2022/0237456 A1 | 7/2022 | Belfiore et al. | |
| 2023/0177826 A1* | 6/2023 | Prakash ................. | G06V 10/84 |
| | | | 382/160 |
| 2023/0419644 A1* | 12/2023 | Takemoto .............. | G06V 10/82 |

FOREIGN PATENT DOCUMENTS

| | | | |
|---|---|---|---|
| CN | 113379099 | B | 6/2022 |
| JP | 7482758 | B2 | 5/2024 |
| KR | 10-2020-0063041 | A | 6/2020 |
| KR | 10-2022-0068044 | A | 5/2022 |
| KR | 10-2022-0074430 | A | 6/2022 |
| KR | 10-2669448 | B1 | 5/2024 |
| WO | 2019/232965 | A1 | 12/2019 |

OTHER PUBLICATIONS

Extended European Search Report dated Sep. 5, 2023 in European Application No. 23163238.1.

* cited by examiner

Inference time

Provide input to first ML model to obtain processing result — S100

Input processing result into second ML model to obtain information on error — S102

Input information on error and processing result into reasoning module — S104

Output corrected processing result — S106

Training time

Obtain training data and predetermined constraints ~S200

Train a first ML model using training data, to output a processing result ~S202

Train a second ML model to detect an error in the processing result ~S204

Jointly training first and second ML models using a corrected processing result output by a reasoning module ~S206

Corrected by
Our system

Scene Graph                    planning extraction

Real Scene actuation          query

FIG. 7B

⇓ Neuro-Solver ⇓

⇓ Mask-Predictor ⇓

⇓ Symbolic-Solver ⇓

FIG. 8A

| dataset | #hints [min − max] | size | # of solutions | challenge |
|---|---|---|---|---|
| big_kaggle | 33.82 [29–37] | 100'000 | unique | scaling |
| minimal 17 | 17.00 [17–17] | 50'000 | unique | minimal number of hints |
| multiple_sol | 34.75 [34–35] | 10'000 | multiple | multiple solutions |
| satnet_data | 36.22 [31–42] | 10'000 | unique | – |

FIG. 8B

|  | big_kaggle | minimal_17 | multiple_sol* | satnet_data |
|---|---|---|---|---|
| Symbolic Baseline | 74.56 | 87.70 | 63.50 | 63.20 |
| SatNet (Wang et al., 2019) | 63.44 | 0.00 | 0.00 | 60.10 |
| SatNet (Wang et al., 2019) + NASR | 69.05 | 0.02 | 24.20 | 81.40 |
| NeurASP (Yang et al., 2020) | timeout | †89.00 | timeout | timeout |
| Our NASR | 84.24 | 87.00 | 73.00 | 82.20 |

FIG. 8C

| | big_kaggle | | minimal_17 | | multiple_sol | | satnet_data | |
|---|---|---|---|---|---|---|---|---|
| Perception | 99.64 | 74.56 | 99.84 | 87.70 | 99.48 | 65.70 | 99.32 | 63.20 |
| SolverNN | 100-98.33 | 62.68 | 100-61.56 | 0.00 | 100-93.72 | 46.70 | 100-94.84 | 24.00 |
| Mask-Predictor | 99.92-99.71 | | 99.54-35.26 | | 99.02-76.12 | | 99.90-96.06 | |
| Neuro-Solver | 47.03 | | 0.00 | | 28.80 | | 14.40 | |
| NASR w/o RL | 80.02 | | 1.59 | | 60.00 | | 76.40 | |
| NASR with RL | 84.24 | | 87.00 | | 73.00 | | 82.20 | |
| NASR-Heur.Mask | 73.11 | | 66.99 | | 55.60 | | 42.80 | |

(a) SolverNN − Cell (1,1)

(b) SolverNN − Cell (5,4)

(c) SolverNN − Cell (8,8)

(d) Mask-Predictor − Cell (1,1)

(e) Mask-Predictor − Cell (5,4)

(f) Mask-Predictor − Cell (8,8)

METHOD AND APPARATUS FOR CORRECTING ERRORS IN OUTPUTS OF MACHINE LEARNING MODELS

CROSS-REFERENCE TO RELATED APPLICATION(S)

This application is a continuation application, claiming priority under § 365(c), of an International application No. PCT/KR2023/011351, filed on Aug. 2, 2023, which is based on and claims the benefit of an UK patent application number 2214162.6, filed on Sep. 28, 2022, in the UK Intellectual Patent Office and EP patent application number 23163238.1, filed on Mar. 21, 2023, in the European Patent Office, the disclosure of each of which is incorporated by reference herein in its entirety.

TECHNICAL FIELD

The present application generally relates to a method and apparatus for neuro-symbolic error correction. In particular, the present application provides a method for detecting and correcting errors in the outputs of machine learning, ML, models.

BACKGROUND ART

Many artificial intelligence, AI, models process input data items, and produce structured outputs. For example, given an image as an input data item, an AI model may produce a graph of objects shown in the image and relations between the objects. Those structured outputs often contain errors, of which many could be corrected if the AI model could perform "common sense" or "domain expert" reasoning to resolve inconsistencies, e.g. performing logical reasoning on the structured output, given a set of domain-knowledge rules.

Such error correction would improve the usability and efficacy of AI devices that require structured representations of raw data as input, such as robots, or augmented reality, AR, glasses. Additionally, the integration of hard constraints on neural network outputs would instill trust in AI models by guaranteeing the sanity of neural network predictions with respect to domain knowledge.

Despite the rapid advance of machine learning, ML, it is still difficult for deep learning architectures to solve a certain classes of problems, especially those that require non-trivial symbolic reasoning (e.g. automated theorem proving or scientific discovery). A very practical example of this limitation—even in applications that are typical deep learning research field such as image processing—is the difficulty of imposing hard symbolic constraints on model outputs. Existing tools cannot upgrade AI modules in this way because they cannot impose hard constraints on the output of a neural network, NN. State-of-the-art methods either add constraints only to the loss function (thus only at training time), or add ad-hoc unscalable constraints to the output layer of the network, or using relaxation of logic (e.g. fuzzy logic) that cannot guarantee the constraints are satisfied; or use (computationally unfeasible in most of the real-world cases) symbolic components.

These shortcomings are relevant when learning systems produce outputs for which domain knowledge constraints apply—current ML systems violate such constraints regularly.

The applicant has therefore identified the need for an improved method for reducing errors in the outputs of AI/ML models.

SUMMARY

In a first approach of the present techniques, there is provided a computer-implemented method for detecting and correcting an error in an output of a first trained machine learning, ML, model, the method comprising: providing an input data item to the first trained machine learning, ML, model, processing the input data item using the first ML model, and outputting, from the first ML model, a processing result; inputting the processing result into a second trained machine learning, ML, model trained to detect an error in the processing result, and outputting, from the second ML model, information on whether there is at least one error in the processing result; and when the output of the second ML model indicates there is at least one error in the processing result, inputting the processing result and the information into a reasoning module, correcting, using the reasoning module, the at least one detected error, and outputting, from the reasoning module, a corrected processing result for the input data item.

The first ML model may also be referred to herein as "a neuro-solver" or "a neural-solver". The second ML model may also be referred to herein as "a mask-predictor" or "a mask-predictor model". The reasoning module may also be referred to herein as "a symbolic solver".

Outputting a processing result from the first trained ML model may comprise outputting a first vector. Outputting information from the second trained ML model on whether there is at least one error in the processing result may comprise generating a second vector that indicates, for each component of the first vector, whether an error is detected in that component. In other words, the second trained ML model determines whether there is any error in the processing result (first vector) of the first trained ML model. The second trained ML model does not correct any identified error(s)—this correction task is performed by the reasoning module.

Thus, the second trained ML model is focused on identifying whether the output of the first trained ML model violates any domain specific constraints that relate to the domain of the input data item. The task of identifying errors is generally easier compared to generating a solution. Thus, having two different components, one for solution generation and one for error identification is advantageous. Since the error correction component solves an easier task, it is also easier to train. The second vector may, for example, comprise binary values (0s and 1s), where a 1 may indicate that the corresponding component in the first vector is acceptable, and a 0 may indicate that the corresponding component in the first vector contains an error. The second vector may be the same size as the first vector, or may be different. More generally, as explained below with respect to the Figures, the values of the second vector may be based on/generated using an adapter function, which combines the first and second vector in a format that can be understood by the reasoning module.

When the second trained ML model identifies there is at least one error in the processing result (first vector), another vector may be generated that shows which parts of the processing result are acceptable and which parts contain an error. This vector is then used, by the reasoning module, to produce a correction. In other words, the second trained ML model may generate information (second vector) indicating whether there are any errors in the processing result (first vector), and then a third vector may be generated which can be used by the reasoning module to produce a correction. The third vector may be generated by an adapter function. Thus, the method may further comprise generating a third vector, when the second vector generated by the second ML model indicates there is at least one error in the processing result, by nullifying each component of the first vector when the second vector indicates an error in that component of the first vector. For example, the third vector may comprise all the components of the first vector except where components contain an error—these components may be replaced with a 0 or other value to indicate that to the reasoning module which component(s) contain an error. Again, an adapter function may be used to combine the first and second vector, and to ensure the values of the third vector are in a format that can be understood by the reasoning module.

Inputting the processing result and the information on at least one error in the processing result into a reasoning module may comprise inputting the third vector into the reasoning module. Then, the step of correcting the at least one detected error may comprise outputting a fourth vector, from the reasoning module, comprising corrected values for each nullified component of the first vector.

Correcting the at least one detected error may comprise determining a correction to the detected error using at least one predetermined constraint specific to a domain to which the input data item belongs. For example, the input data item may be a visual Sudoku puzzle, and the domain may therefore be Sudoku and the predetermined constraints may be Sudoku rules. In another example, the input data item may be an image showing at least two objects in an environment, and the domain may be the at least two objects in the physical environment and the predetermined constraints may be the rules which describe allowed relationships between objects in that physical environment.

The method may be used to correct the output of any trained ML model. That is, the first trained ML model may be any model and may be able to process any type of data, including images, audio, text, and so on. It will be understood this is a non-exhaustive list of possible types of input data item. However, for the method to work, the output of the first ML model (i.e. the first neural component of the pipeline) may need to be interpretable, so that the reasoning module (i.e. the symbolic component of the pipeline) is able to perform corrections by applying symbolic rules.

In one example, providing an input data item may comprise providing an image to the first trained ML model. Processing the input data item using the first trained ML model may comprise: extracting features from the image; and outputting a processing result using the extracted features. Thus the first trained ML model may be trained to process images. Features of the image may, for example, be shapes, lines, edges and any other suitable features. The features of the image may be used to identify objects that are shown in the image. The image may be an image of a scene depicting at least two objects, and outputting a processing result using the extracted features may comprise outputting a scene graph showing a relationship between the at least two objects in the scene. A scene graph is a data structure which arranges and represents logical connections between objects in a scene. In an example, if the input image shows a spoon inside a bowl, the first trained ML model may output a graph with a node corresponding to the spoon and a node corresponding to the bowl and a directed edge between these two nodes indicating the relationship between the spoon and the bowl. The graph may indicate that the spoon is inside the bowl (correct), or that the bowl is inside the spoon (incorrect). If the latter scene graph is output, the present method may identify the error (because a bowl cannot be inside a spoon), and output a corrected scene graph.

In a second approach of the present techniques, there is provided an apparatus for detecting and correcting an error in an output of a first trained machine learning, ML, model, the apparatus comprising: at least one processor coupled to memory, and arranged for: providing an input data item to the first trained machine learning, ML, model, processing the input data item using the first ML model, and outputting, from the first ML model, a processing result; inputting the processing result into a second trained machine learning, ML, model trained to detect an error in the processing result, and outputting, from the second ML model, information on whether there is at least one error in the processing result; and when the output of the second ML model indicates there is at least one error in the processing result, inputting the processing result and the information into a reasoning module, correcting, using the reasoning module, the at least one detected error, and outputting, from the reasoning module, a corrected processing result for the input data item.

The features described above with respect to the first approach apply equally to the second approach and therefore, for the sake of conciseness, are not repeated.

The apparatus may be a constrained-resource device, but which has the minimum hardware capabilities to use a trained neural network/IL model. The apparatus may be any one of: a smartphone, tablet, laptop, computer or computing device, virtual assistant device, a vehicle, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example apparatuses.

The apparatus may further comprise: at least one image capture device for capturing an image. In this case, providing an input data item may comprise providing an image to the first trained ML model, and processing the input data item may comprise extracting features from the image.

In one example, the apparatus may be a controllable autonomous or semi-autonomous apparatus for performing a task in an environment comprising at least two objects. In this case, the at least one image being captured may be an image of the environment, and the at least one processor may use the corrected processing result to control the controllable autonomous or semi-autonomous apparatus in the environment.

For example, the environment may be a home or kitchen, or other domestic, office or factory/warehouse environment, in which the controllable apparatus is performing a task, such as moving an object relative to another object.

The controllable apparatus may comprise at least one gripper, and the at least one processor may control the at least one gripper to interact with an object in the environment based on the corrected processing result.

For example, the controllable apparatus may need to pick up a spoon from a bowl—in this example, the environment comprises at least the bowl and the spoon, both of which are objects in the environment. In this example, the controllable apparatus is controlled to move the bowl and the spoon relative to each other in a logically consistent manner. The controllable apparatus needs to understand that the spoon is inside the bowl, so that the spoon can be picked up.

The apparatus may further comprise a system for moving the apparatus through the environment. The at least one processor may control the system, to move the apparatus, based on the corrected processing result so that the apparatus does not bump into objects or try to move through solid objects.

In another example, the apparatus may be a wearable augmented reality device for controlling virtual objects blended into a real-world environment comprising at least one real object. In this example, the at least one image being captured may be an image of the environment, and the at least one processor may use the corrected processing result to control virtual objects correctly with respect to the at least one real object. This may be useful so that the virtual objects correctly interact with the real-world object(s) and do not violate any physical rules of the real-world environment.

In a third approach of the present techniques, there is provided a computer-implemented method for training machine learning, ML, models to detect and correct errors, the method comprising: obtaining a training dataset comprising a plurality of data items, and a set of predetermined constraints specific to a domain to which each data item belongs; training a first ML model to process data items from the training dataset and to output a processing result for each data item; training a second ML model to detect an error in the processing result for each data item, and to output information on whether there is at least one error in the processing result; and jointly training the first and second ML models by: inputting, when the output of the second ML model indicates there is at least one error in the processing result for a data item, the processing result and the information into a reasoning module; correcting, using the reasoning module, the at least one detected error using the set of predetermined constraints; outputting a corrected processing result for the data item; and using the corrected processing result to jointly train the first and second ML models.

The first and second ML models may be jointly trained using reinforcement learning, or any other suitable learning algorithm.

In a related approach of the present techniques, there is provided a computer-readable storage medium comprising instructions which, when executed by a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

DESCRIPTION OF DRAWINGS

Implementations of the present techniques will now be described, by way of example only, with reference to the accompanying drawings, in which:

FIG. 7B is an illustration of the inputs and outputs in the example of FIG. 7A;

FIG. 8A shows information on the datasets used to perform experiments conducted using the example of FIG. 7A, and FIGS. 8B and 8C show results from these experiments;

MODE FOR INVENTION

Figure 1:
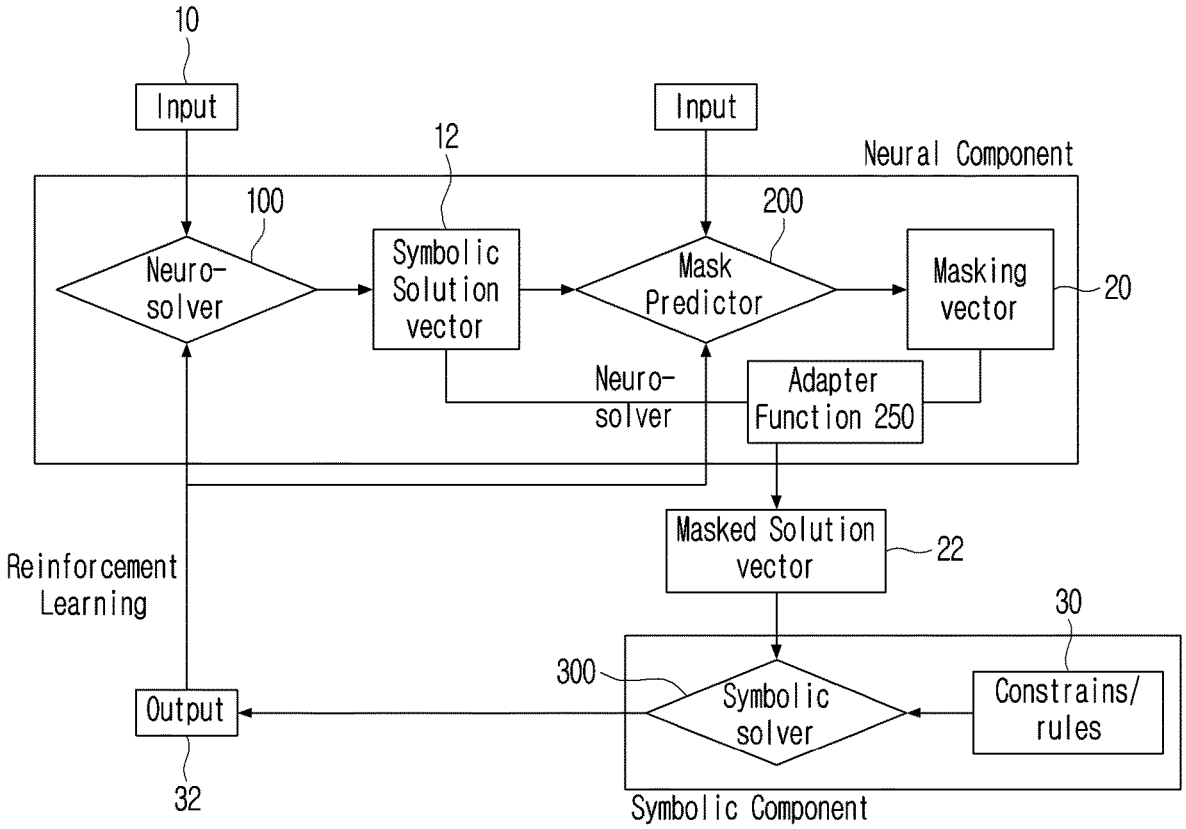
FIG. 1 is a schematic diagram illustrating a pipeline for detecting and correcting an error in an output of a first trained machine learning, ML, model.

Broadly speaking, embodiments of the present techniques provide a method for reducing errors in the outputs of machine learning, ML, models using reasoning on a potential output of the models to resolve any inconsistencies before outputting a final result from the models. The final result respects a set of rules or constraints, which may include logical constraints. Advantageously, this reduces the risk of a model outputting a result which violates some rules associated with the overall task of the model, which could be dangerous or provide a poor user experience.

Despite the rapid advancement of machine learning, ML, for deep learning architectures it is still difficult to solve a certain classes of problems. Some tasks require non-trivial symbolic reasoning. Often these tasks require the imposition of hard symbolic constraints to the output of a model. How to impose these type of constraints at testing to ensure that the domain-specific knowledge is respected by the predictions is still an open problem.

The successful imposition of rules/constraints is a very desirable property for Artificial Intelligence, AI, systems, especially when deployed in regulated environments. Nowadays, together with explainability, the ability to ensure the respect of ethical decisions and principles of fairness in automated decision-making processes is a fundamental requirement for AI systems. Some far-reaching examples include automated online scoring of credit or mortgage applications, e-recruitment without human intervention, automated computation of insurance quotes, etc. The successful imposition of rules/constraints is a very desirable property not only for ethical/safety implications, but also to improve ML algorithms, facilitating the learning by reducing the hypothesis space to only the feasible part.

More recently some progress has been made in this direction, but most of the efforts revolve around the imposition of a "soft"-constraint (e.g. incorporation of constraints in the loss function, or considering a relaxation of the constraints/logic. In this way, during learning, the model is encouraged to move close to a solution that satisfies the constraints/rules, but this is not ensured. Moreover, the constraints are imposed only at training time, while the imposition of constraints at test time is still an unexplored research area.

Most of the state-of-the-art methods consider very simple logic constraints. However, other types of constraints are possible, such as arithmetic constraints, natural language constraints, structured constraints (e.g. using graphs), etc. A recently popular trend is the development of neuro-symbolic integration systems to try to bridge the gap between neural models and classic symbolic methods, an they have been applied to a variety of problems. In particular some have been applied to the problem of incorporating constraints in neural-networks. However, none of the proposed models completely solves the problem.

The present applicant provides a solution that is a trade-off between the efficiency of constraint-free neural inference, and the prohibitive cost of exhaustive reasoning at inference time. The present applicant proposes a neuro-symbolic integration pipeline that is particularly useful for solving tasks in which exhaustive reasoning is not feasible (in most real-word scenarios standard reasoning techniques are not scalable and not robust to noise) while purely neural architectures are not accurate enough (making mistakes that violates the domain-knowledge constraints/rules). The present applicant uses the benefit of both the symbolic and the neural worlds. The idea is to use a neural architecture (Neuro-solver) to try to solve a given task and to keep only the correct part of its prediction, while delegating to fill the remaining parts to a symbolic reasoner. The symbolic reasoner has the role of correcting the wrong predictions of the Neuro-solver. The identification of the correct/wrong components is performed by another neural component (that is called Mask-predictor) that will perform a neural focus of (reasoning) attention on the predictions of the Neuro-solver, checking which parts of the Neuro-solver output satisfy the given domain-knowledge constrains/rules. In this way, the symbolic reasoner (which is very computationally expensive) is made more efficient, since its search space is reduced and the focus of where and when to reason in neuro-symbolic inference is redirected.

The contribution of the present techniques may be summarized as follows: 1) a novel neuro-symbolic integration pipeline with a novel neural-attention module (Mask-predictor) that works with any type of constraints/rules; 2) application of such architecture in the case of the visual-Sudoku task (given an image of a incomplete Sudoku board, the goal is to provide a complete symbolic solution) considerably improving the state-of-the-art; 3) application of such architecture in the case of the Predicate Classification task for Scene graph prediction (given an image of an environment with more than one element in it, the goal is to provide a complete graph containing a node for each element and all the relationship between them in the form of edges) improving the state-of-the-art; and 4) proving that including an existing state-of-the-art model in the present pipeline (with the role of Neuro-solver/first ML model) significantly improves the model performance.

FIG. 1 is a schematic diagram illustrating a pipeline for detecting and correcting an error in an output of a first trained machine learning, ML, model. An AI model may, for example, process an input image depicting objects, and output a graph showing the relations between the objects. As mentioned above, these structured outputs may contain errors which can be detected and corrected.

The key challenge that the present techniques resolve is the tension between (1) exact reasoning being required to properly correct errors, and (2) exact reasoning being too slow for use during live deployment of an AI system. The key idea is to train a neural attention module that dynamically decides where to focus the attention of the slower reasoning process, to achieve a good trade-off between high-quality error correction and fast low-latency inference.

As shown in FIG. 1, the neuro-symbolic pipeline is composed of three main components: 1) a neuro-solver, also referred to as a first ML model 100, 2) a mask-predictor, also referred to as a second ML model 200, and 3) a classic symbolic solver, also referred to as a reasoning module, 300. The first and second ML models, 100, 200, are trained individually, for example using supervised learning, and are then refined end-to-end using, for example, reinforcement learning. Since the reasoning engine is not generally differentiable, the framework may be trained with reinforcement learning (RL). This pipeline works independently of the input type, which can be in form of an image, a piece of text, audio, etc. Moreover, it is entirely modular and the three main components can be substituted with different types of architecture to suit the input data items being processed.

The input to the first ML model/Neuro-Solver 100 may be in form of an image, a piece of text, symbolic, etc. The output may be a complete solution to the problem under consideration.

The first ML model 100 may be a learning architecture to solve a given task, given an input data item belonging to a specific domain. As mentioned above, the first ML model 100 may be divided in two sub-components: the Perception module and a SolverNN module. The perception module may be a neural network, NN, that parses an input data point and transforms it in a symbolic vector, which correspond to the symbolic representation of the input object. If images are considered as inputs, the Perception module may be a convolutional neural network. The SolverNN module may be a neural network, NN, that takes in a symbolic vector as input, and solves it (depending on the task under consideration) providing a full symbolic solution as output. An example architecture for the SolverNN is a Transformer model. Alternatively, the first ML model/Neuro-Solver 100 may have a unique architecture that enables computation of these two steps indirectly (i.e. not going through the intermediate symbolic representation), or simultaneously. An advantage of splitting the the the first ML model 100 into two components (Perception and SolverNN) is that the components are easier to train separately since solving smaller/easier sub-tasks. This is particularly advantageous when the amount of training data or the quality of the training data is poor.

The second ML model 200 may be a learning architecture that identify the elements of the output of the first ML model 100 that do not satisfy domain-specific constraints and decides which subset of neuro-solver predictions should be eligible for revision by the symbolic solver/reasoning module 300 using domain-specific knowledge. That is, the second ML model 200 has the role of identifying the errors in the predictions of the first ML model 100. The second ML model 200 essentially learns when and where to reason in order to effectively achieve high prediction accuracy and constraint satisfaction with low computation cost. Therefore, the second ML model 200 makes the symbolic reasoning more efficient, re-directing the focus of the slower reasoning component only on the wrong predictions. This allows for a more efficient reasoning, since the search space of the reasoning engine is smaller. The second ML model 200 solves the task of (neuro-) constraints satisfaction, identify the parts that do not satisfy the given constraints. The second ML model 200 implicitly learns the constraints.

The reasoning module 300, a classic solver/theorem-prover, corrects the errors in the predictions of the first ML model 100 that were identified by the second ML model 200. The reasoning module 300 depends strongly on the type of input and the problem under consideration. In particular, the form of constraints 30 to be applied to the neural component (i.e. first and second ML models) plays a key role. For logic based constraints, classical symbolic reasoners can be used, such as Prolog engines (e.g. SWI-Prolog), probabilistic logic engines (e.g. ProbLog), SAT solvers (e.g. Z3), python libraries that mimic symbolic reasoning engines (e.g. PySwip), theorem provers (e.g. Vampire prover), etc. For arithmetic constraints, constraints solvers can be used (e.g. ILP or MILP solvers) or general mathematical tools (e.g. Mathematica). Additionally, or alternatively, ad-hoc brute force algorithms that exhaustively or using some heuristics explore the symbolic solutions search space may be used.

The neuro-symbolic pipeline uses the second ML model/mask-predictor 200 as a fast attention module to identify the violation of symbolic constraints in outputs of the Neuro-solver/first ML model 100. This is advantageous because it focusses (and therefore reduces) the effort of the reasoning module 300, which is a computationally intensive module. Thus, by having a pipeline which first executes an efficient component (module 100) to solve a task, and then delegates a symbolic solver (module 300) to correct any mistakes of the neural solver, identified by another component (module 200), each component may require less computational-resource (e.g. processing power and/or memory) to perform its task, and may be easier to train/execute.

The output of the reasoning module 300 may be used as part of the reward function for the reinforcement learning algorithm when training the whole pipeline end-to-end This is particularly useful in the cases in which exhaustive (probabilistic) reasoning is not feasible. In most real-word scenarios standard reasoning techniques are not scalable, while purely neural architectures make mistakes that violates the input symbolic constraints. Moreover, the modularity of the pipeline enables the mask-predictor/second trained ML model 200 and the symbolic solver/reasoning module 300 parts to be applied to any neural network (i.e. first trained ML model 100) that solves any problem, which advantageously may improve the prediction accuracy of the first trained ML model 100. The only requirement is that the first trained ML model 100 should output an interpretable solution vector (on which the imposition of some hard constraints is desired).

As shown in FIG. 1, the method to detect and correct errors in the first ML model 100 comprises providing an input data item 10 to the first trained ML model 100. The first trained ML model 100 processes the input data item 10, and outputs a processing result 12, which may be a first vector (also referred to as a symbolic solution vector).

The second ML model 200 has the role of identifying the errors in the predictions, i.e. the processing result/first vector 12, of the first ML model 100. The second ML model 200 makes the symbolic reasoning more efficient, directing the reasoning focus only on the wrong predictions so that the reasoning module 300 can correct them. The second ML model 200 solves the task of (neuro-) constraints satisfaction, identifying the parts of the input vector 12 that do not satisfy the given constraints. The second ML model 200 implicitly learns the constraints.

Thus, the processing result/first vector 12 is input into the second trained ML model 200, which is trained to detect an error in the processing result. The second ML model 200 generates information 20 on whether there is at least one error in the processing result 12. The generated information may be a second vector 20 that indicates, for each component of the first vector 12, whether an error is detected in that component. There are two possibilities at this stage. Firstly, the second ML model 200 may not identify any errors in the processing result 12. In this case, the information/second vector 20 that is generated by the second ML model 200 may be a masking vector that shows each component of the first vector/processing result 12 is correct. (See FIG. 7A for an example masking vector, in which errors in the first vector are indicated using 0s). Secondly, the second ML model 200 may identify at least one error in the processing result 12. In this case, the information/second vector 20 that is generated by the second ML model 200 may be a masking vector that shows which components of the first vector/processing result 12 are correct and which are incorrect.

The second vector 20 that is generated by the second ML model 200 may not itself be provided to the reasoning module 300. The output of the second ML model 200 may be information on whether there is at least one error in the processing result, and if there is at least one error, the location of the error(s) in the processing result 12. The input into the reasoning module 300, is generated by combining the first vector 12 and the second vector 20 using an appropriate adapter function 250. This input of the reasoning module 300 may be a third vector 22, also referred to as a masked solution vector. The third vector 22 may be generated, by an adapter function 250, by nullifying each component of the first vector 12 when the second vector 20 indicates an error in that component of the first vector 12. If no errors are detected, then a third vector 22 can still be generated to be input into the reasoning module 300—in this case, the third vector may be identical to the first vector. In the no error case, the reasoning module 300 may output the same output as the input (i.e. the third vector) because it does not need to perform any correction. Alternatively, in case of no detected errors, a third vector 22 may not be generated, in which case the reasoning module 300 is not provided with an input to process, and the processing result 12 is used as the final output of the whole pipeline.

With respect to the reasoning module 300, the choice of the architecture depends on, for example, the type of input, the problem under consideration and the type of constraints.

The third vector 22 may be input into the reasoning module 300, so that the reasoning module can correct the at least one detected error. The reasoning module 300 may determine a correction to the at least one detected error by using at least one predetermined constraint 30 specific to a domain to which the input data item belongs. The reasoning module 300 may output a fourth vector 32, which comprises corrected values for each nullified component of the first vector 12 (as indicated by the third vector 22). This output fourth vector 32 may then be used as the final output of the whole pipeline at inference time. FIG. 1 shows how, at training time, the fourth vector 32 may be used to train the first and second ML models via, for example, reinforcement learning.

The pipeline of FIG. 1 be used to correct the output of any trained ML model 100. That is, the first trained ML model 100 may be any model and may be able to process any type of data, including images, audio, text, and so on. It will be understood this is a non-exhaustive list of possible types of input data item. However, for the method to work, the input data item may need to be converted into symbolic data, so that the reasoning module is able to identify corrections.

In particular, the type of tasks where multiple interpretable "facts" are predicted by the first ML model 100 on which the imposition of hard constraints is desirable is considered. More formally, a set of input data points ($x \in \mathcal{X}$) representing instances to solve (e.g. the picture of a partially filled Sudoku board) is considered, and, a set of multi-dimensional output data points ($y \in \mathcal{Y}$) that correspond to complete interpretable solutions (e.g. the symbolic representation of a completely filled Sudoku board). The collection of N of these pairs of data points will form the task dataset $$D = \{x^i, y^i\}_{i=1}^{N}.$$

Moreover, it is required that the task (e.g. completing a partially filled Sudoku board) can be expressed (fully or partially) by a set of rules $\mathcal{R}$ in the form of domain-knowledge constraints (e.g. the rules of the Sudoku game).

The goal is to learn a function $f\colon \mathcal{X} \to \mathcal{Y}$ that associates a solution to a given input instance, and which further satisfies the rules $\mathcal{R}$. To solve this class of problems, the above mentioned neuro-symbolic pipeline that integrates the three components, 100, 200, 300, is proposed.

Figure 2:
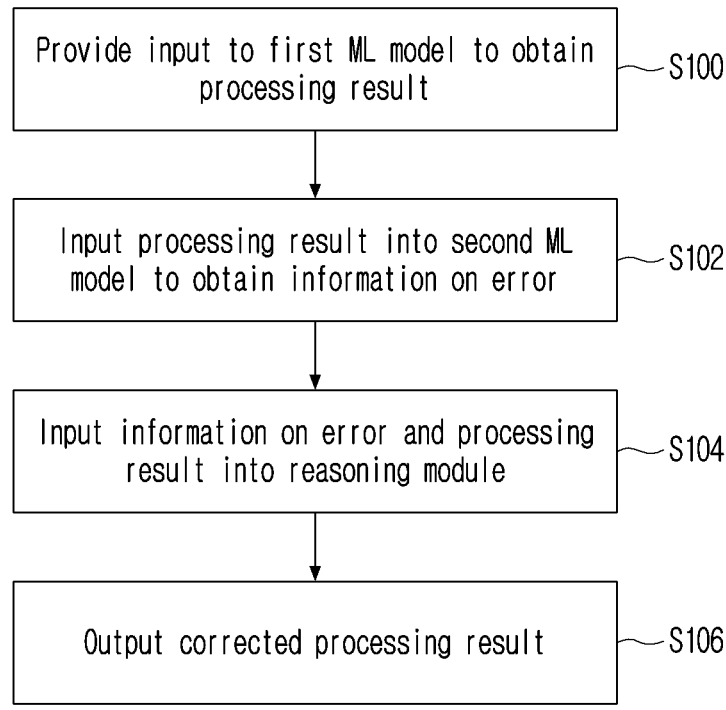
FIG. 2 is a flowchart of example steps in a method for detecting and correcting an error in an output of a first trained machine learning, ML, model.

FIG. 2 is a flowchart of example steps in a method for detecting and correcting an error in an output of a first trained machine learning, ML, model. The method comprises: providing an input data item 10 to the first trained machine learning, ML, model 100, processing the input data item 10 using the first ML model 100, and outputting, from the first ML model 100, a processing result 12 (step S100). The processing result may be considered an approximate solution or prediction, and the processing result may take different forms. In one example, the first ML model 100 may output a probability distribution which indicates the probability of each possible solution. In another example, the output 12 may simply be a prediction by the first ML model 100, such as a pixel value or any other kind of value/number/symbol.

The method comprises: inputting the processing result 12 into a second trained machine learning, ML, model 200 trained to detect an error in the processing result 12 (step S100). The method comprises generating, using the second ML model 200, information 20 on whether there is at least one error in the processing result (step S102).

That is, the processing result 12 is provided to and analysed by the second ML model 200, which has the role of identifying the components of the processing result 12 that do not satisfy a set of domain-knowledge constraints/rules $\mathcal{R}$. The information 20 generated by the second ML model 200 may then be combined with the output of the first ML model 100, to provide the masked solution vector 22 (also referred to as the third vector). This is, for example, done by deleting the wrong elements of the predictions, leaving the corresponding components "empty" (the component may be filled by an additional class 0, indicating a masked element). The masked solution vector 22 may be generated by an adapter function 250.

When the information 20 generated by the second ML model 200 indicates there is at least one error in the processing result 12, the method comprises: inputting the processing result 12 and the information 20 into a reasoning module 300 (step S104); correcting, using the reasoning module 300, the at least one detected error, and outputting, from the reasoning module 300, a corrected processing result 32 for the input data item 10 (step S106).

That is, at step S104, the masked solution vector 22 may be fed into the reasoning module 300, which functions to fill the gaps or nullified values in the vector 22 with a feasible solution (satisfying the constraints/rules $\mathcal{R}$). The reasoning module 300 provides a corrected output 32.

In other words, the first ML model 100 is a function ns(•) that that maps an input $x \in \mathcal{X}$ (where $\mathcal{X}$ is the set of all possible inputs for the task under consideration) to a probability distribution over $\mathcal{Y}$ (where $\mathcal{Y}$ is the set of all the possible solutions). The second ML model 200 is a function mp(•) that takes in input a probability distribution over $\mathcal{Y}$ and produces as output a probability distribution, for example, over $\mathcal{Z} = [0,1]^k$ (where k is the dimension of $y \in \mathcal{Y}$). The reasoning module 300 is a function sb(•) that maps to $\mathcal{Y}'$ (where $\mathcal{Y}'$ is, for example, $\mathcal{Y}$ with an additional class 0, corresponding to a masked solution element) to a probability distribution over $\mathcal{Y}$. It will be understood that using "0" to indicate elements that need to be corrected, and "1" to indicate elements that are correct is simply an example way that the errors may be indicated. More generally, an adapter function may be used, as explained below.

The final hypothesis function $f_\theta$, mapping $\mathcal{X}$ to a probability distribution over $\mathcal{Y}$ and representing the neuro-symbolic pipeline approximating the target function $f(•)$, is defined as:

$$f_\theta(x) = sb(ns(x) \odot \arg\ \max(mp(ns(x)))), \mathcal{R}) \qquad (1)$$

where $\odot$ is the Hadamard (element wise) product and $\theta$ are the learnable parameters of ns and mp. However, this assumes the reasoning module 300 expects 0 to indicate a symbol to fill. If the reasoning module 300 expects another symbol (or more generally), an adapter function can be added as $f_\theta(x) = sb(adapt(ns(x), \arg\ \max(mp(ns(x)))), \mathcal{R})$ This system pipeline works independently of the input type, that can be in form of an image, a piece of text, symbolic, etc. Moreover, it is entirely modular and the single components can be substituted with different type of architectures. The modules/components are now explained in turn in more detail.

Figure 3:
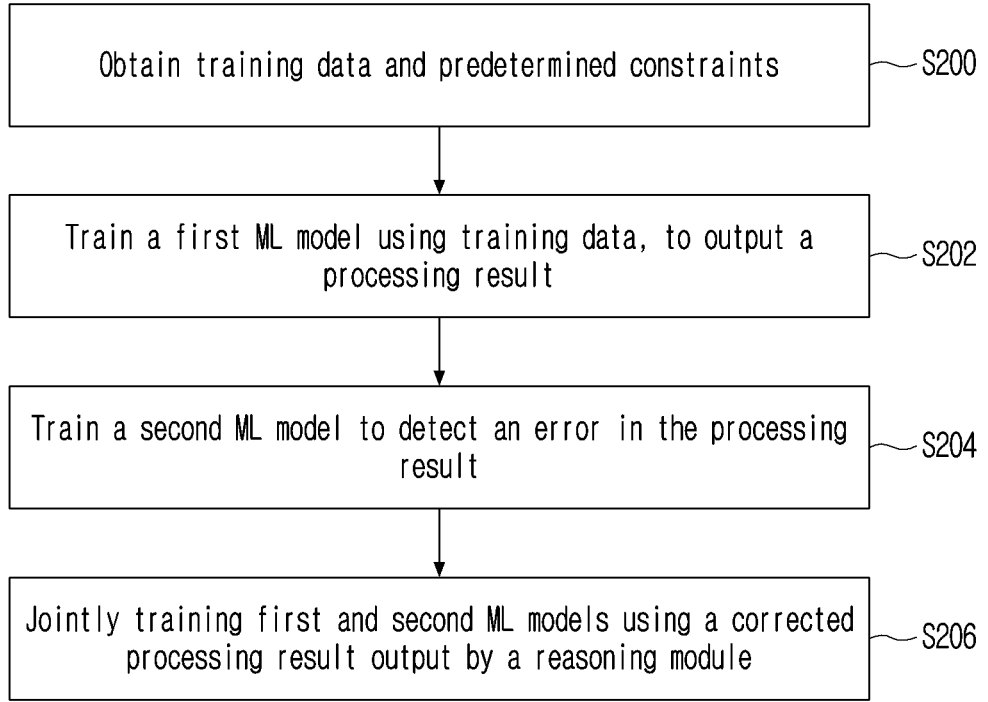
FIG. 3 is a flowchart of example steps in a method for training ML models to detect and correct errors.

FIG. 3 is a flowchart of example steps in a method for training ML models to detect and correct errors. The three components of the pipeline may be trained in a supervised manner (of which Module1 can be even a black-box pre-trained method). The overall system can be refined end-to-end using the reinforcement learning paradigm (e.g. REINFORCE). That is, learning may be done in two steps: the first and second ML models, 100, 200, may first be pre-trained individually in a supervised fashion and then integrated together and refined using reinforcement learning (RL). The complete pipeline is referred to as NASR, and ablations are disambiguated where appropriate.

The method may comprise training the first and second ML models separately first, and then training the first and second ML models jointly using, for example, reinforcement learning. The method comprises: obtaining a training dataset comprising a plurality of data items, and a set of predetermined constraints specific to a domain to which each data item belongs (step S200); training a first ML model to process data items from the training dataset and to output a processing result for each data item (step S202); and training a second ML model to detect an error in the processing result for each data item, and to output information on whether there is at least one error in the processing result (step S204).

Supervised Learning. To train the first ML model 100, the task dataset $$D = \left\{x^i, y^i\right\}_{i=1}^N$$

(also used for the whole pipeline) is used. For training the second ML model 200, a synthetic dataset $$D_{mp} = \left\{y_n^i, m^i\right\}_{i=1}^{N'}$$

is created where: $y_n$ is a symbolic solution instance with the addition of noise that violates the domain-knowledge constraints; and m is the corresponding masking solution. A masking vector m (i.e. the third vector 22) has the same dimension of the input $y_n$ and may, for example, have a 1 on the components of $y_n$ that do not violate the rules $\mathcal{R}$ and 0 for the components in which noise has been introduced.

The generation of $D_{mp}$ can be done in different ways depending on the type of data that is being considered: 1) the input data $y_n$ can be either generated by perturbing the y in D or 2) it can be generated synthetically following a uniform distribution over the possible $y_i$ in D. In the former option, each data point $y_n \in D_{mp}$ has a corresponding data point $y \in D$ of which some components have been modified. The corresponding masking vector m will have a 1 on the components of $y_n$ that has not been modified and 0 for the components in which noise has been introduced. In general, the latter option is not always possible: for example, in the case of the visual Sudoku task (see description of FIGS. 5A and 5B below), this would require the ability to sample minimal (i.e. a board in which no hint can be deleted without losing uniqueness of the solution) symbolic Sudoku boards uniformly at random, which is still a non-trivial open problem.

The method in FIG. 3 may further comprise jointly training the first and second ML mode (step S206). The joint training may comprise: inputting, when the output 20 of the second ML model 200 indicates there is at least one error in the processing result 12 for an data item 10, the processing result 12 and the information 20 into a reasoning module 300; correcting, using the reasoning module 300, the at least one detected error using the set of predetermined constraints 30; outputting a corrected processing result 32 for the data item 300; and using the corrected processing result 32 to jointly train the first and second ML models 100, 200.

Reinforcement Learning. While the first ML model 100 and the second ML model 200 can be trained independently with supervised learning, the use of reinforcement learning is necessary for end-to-end learning if the reasoning module 300 is not differentiable. End-to-end learning is important so that the neural components can adapt to each other and to the expected interventions of the Symbolic-Solver. The REINFORCE algorithm is an example of a reinforcement learning algorithm, with its standard policy loss: $\mathcal{L}(x; \theta) = -r \log P_\theta(m|ns(x))$ where r indicates the RL reward obtained when applying the reasoning module 300 on the prediction ns(x) masked by m. However, it is possible to use alternative reinforcement learning algorithms without changing the overall pipeline.

As mentioned above, the goal of this system is the imposition of hard constraints at test time to ensure that the domain-specific knowledge is respected by the predictions. In the state of the art methods this is done only at training time and using "soft"-constraints (e.g. incorporation of constraints in the loss). In contrast, the present neuro-symbolic pipeline redirects the focus on the symbolic (the most computationally expensive) component only on the parts that need correction, making the reasoning more efficient and the neuro-modules more accurate. There are two key advantages of the present techniques. Firstly, training a NN to identify the violation of symbolic constraints by a ML method (i.e. the Neuro-solver). Secondly, the end-to-end training of the system using reinforcement learning: the reasoning component is used as part of the reward function for the overall architecture. The present techniques are particularly useful in the cases in which exhaustive (probabilistic) reasoning is not feasible. In most real-word scenarios standard reasoning techniques are not scalable, while purely neural architectures make mistakes that violates the input symbolic constraints. Moreover, the modularity of the system, allows to plug in the Mask+symbolic reasoned part of the pipeline to any neural network that solves a different problem, improving its prediction accuracy. The only requirement is that the NN should output an interpretable symbolic solution vector (on which the imposition of some hard constraints is desired).

This architecture is particularly useful for solving tasks in which exhaustive (probabilistic) reasoning is not feasible (in most real-word scenarios standard reasoning techniques are not scalable) while purely neural architectures are not accurate enough (making mistakes that violate the domain-knowledge constraints/rules). By performing a quick approximate solution, and then focusing the attention of the expensive reasoning engine only on the parts that will benefit from reasoning, a favourable efficiency-accuracy trade-off is achieved.

By adding the symbolic component, performance is increased at the cost of additional of running time, which will be higher compared to a purely neural model. Since the attention is done by a neural model (Mask-Predictor), there is no guarantee that all prediction mistakes will be found. However, there are some techniques for minimizing this risk which will be discussed later on. Given the modularity of the pipeline described above (also termed NASR pipeline), it is possible to substitute each component with alternative ones. Each component may therefore be adapted to the task at hand, potentially significantly improving performance. For the same reason, the pipeline works independently of the input type, that is, the input can be an image, text, symbolic or any other type of input.

Figure 4:
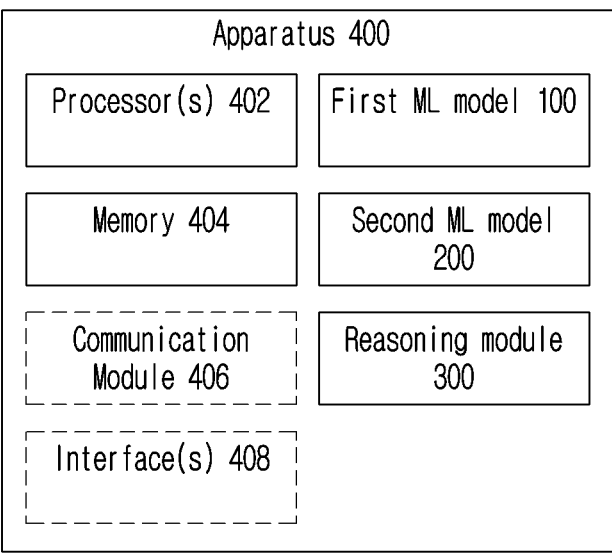
FIG. 4 is a block diagram of an apparatus for identifying an error in an output of a first trained ML model.

FIG. 4 is a block diagram of an apparatus 400 for identifying an error in an output of a first trained ML model. The apparatus 400 may be, for example, a constrained-resource device, but which has the minimum hardware capabilities to use a trained neural network/ML model pipeline. The apparatus may be: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a smartwatch, a fitness tracker, and a wearable device. The apparatus may be any controllable autonomous or semi-autonomous apparatus for performing a task in an environment. It will be understood that this is a non-exhaustive and non-limiting list of example devices.

The apparatus 400 comprises at least one processor 402 coupled to memory 404. The apparatus may store a pretrained first ML model/Neuro-solver 100, a pretrained second ML model/mask-predictor 200 and a reasoning module/symbolic reasoner 300. The processor may be arranged for providing an input data item 10 to the first trained machine learning, ML, model 100, processing the input data item using the first ML model 100, and outputting, from the first ML model 100, a processing result 12; inputting the processing result 12 into a second trained machine learning, ML, model 200 trained to detect an error in the processing result 12, and outputting, from the second ML model 200, information 20 on whether there is at least one error in the processing result 12; and when the output of the second ML model 200 indicates there is at least one error in the processing result 12, inputting the processing result 12 and the information 20 into a reasoning module 300, correcting, using the reasoning module 300, the at least one detected error, and outputting, from the reasoning module 300, a corrected processing result 32 for the input data item 12.

The at least one processor 402 may comprise one or more of: a microprocessor, a microcontroller and an integrated circuit. The memory 404 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The apparatus 400 may comprise at least one communication module 406 which may be used to receive the data that is to be processed. The communication module 406 may also be used to receive or update the first ML model/Neuro-solver 100, second ML model/Mask-predictor 200 and/or reasoning module/Symbolic reasoner 300 components of the pipeline.

The apparatus may comprise at least one interface 408 for receiving an input data item. For example, the at least one interface 408 may be a camera or other image capture device. The camera may, for example, be used to capture images of an environment. The images may then be processed by the processor, using the first ML model 100, second ML model 200 and reasoning module 300. The processor may use the corrected processing result to control the apparatus in the environment.

Figure 6:
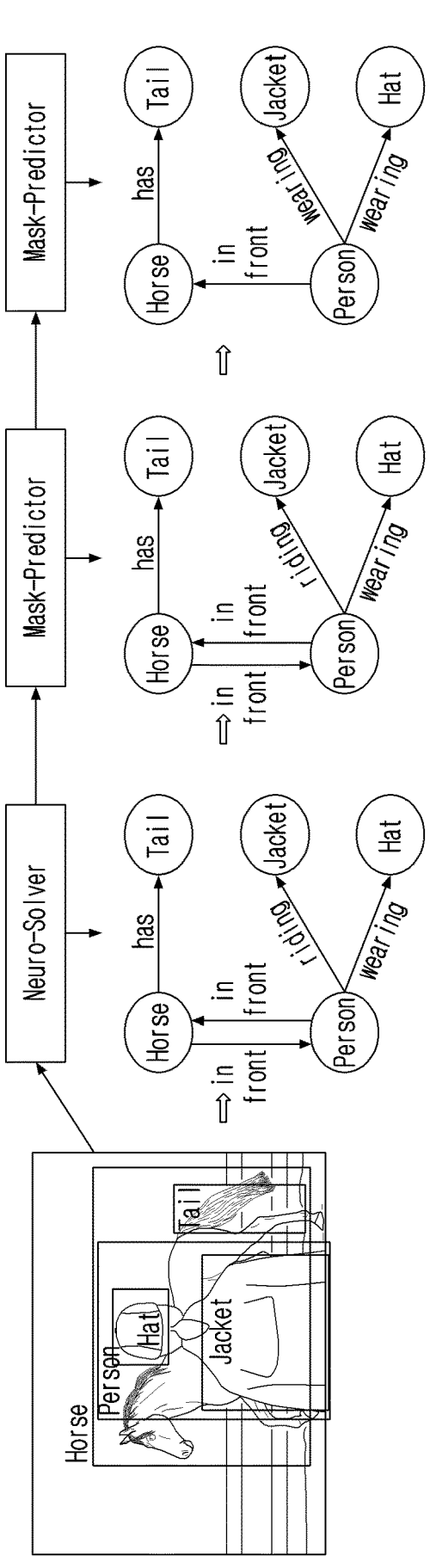
FIG. 6 is schematic diagram illustrating how the present method may be applied to another example graphical problem.

Some, non-limiting, possible applications of the present techniques include Augmented Reality and Robotics. In both cases an AI perception module extracts a structured semantic representation of an environment from raw data (e.g. scene graph from real-time image, as shown in FIG. 6), so that the overall system can correctly perform a task that involves the interaction with the surrounding scene. This representation contains elements connected with each other and with a set of properties (such as colors and materials). The AI system (e.g., robot planner) uses this representation to decide how to act (e.g., manipulate objects) to achieve its task. Errors in the scene graph will lead the system (e.g., robot) to perform incorrect actions and thus it is important to correct as many errors as possible before planning. The system is used to correct these representations by following a set of domain-knowledge rules (e.g. a spoon can be in a bowl but not vice-versa).

Figure 5:
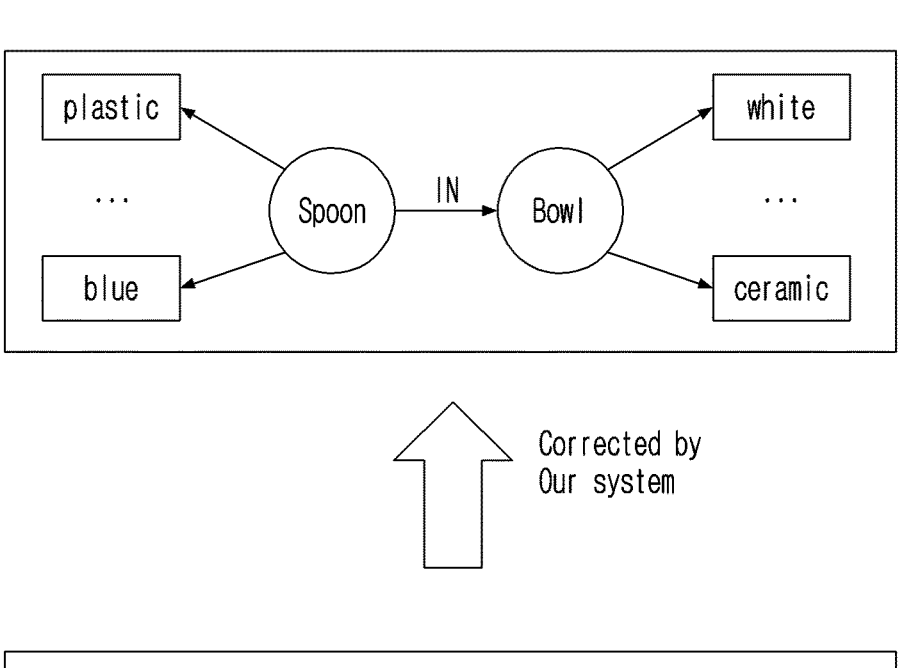
FIG. 5 is a schematic diagram illustrating how the present method may be applied to an example graphical problem.
Figure 5:
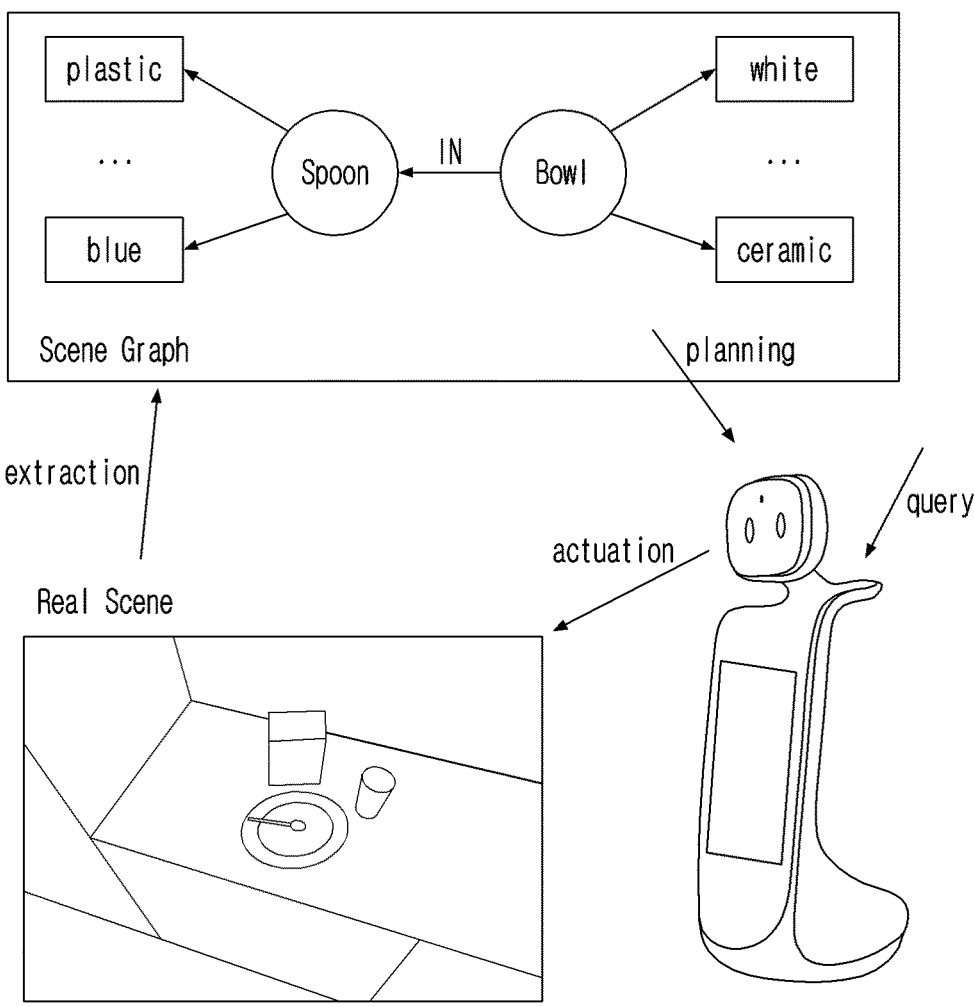

FIG. 5 is a schematic diagram illustrating how the present method may be applied to an example graphical problem with logical constraints. A graphical problem with logical constraints is one where the output is a graph. (For reference, a logical problem is one where the output is, for example, a set of logical formulas or statements). Visual robot perception is a challenging task. To plan appropriate actions, a robot should not only be able to detect a cup but also correctly estimate the material etc. to be able to apply the appropriate amount of force picking it up. This is usually done using an ontology listing the attributes of each type of objects (openable, tool capable of cutting, etc.) and by linking them to the objects in the scene. The different rules related to the properties can be used to improve the predictions and avoid mistakes (e.g. electric implies not-water-proof).

Structured scene understanding is crucial for planning the sequence of actions to reach a goal. In the example to the right, the scene graph error is corrected by the present system. This would in turn allow the robot planner to decide appropriate actions, e.g., take the spoon out before using the bowl, or realise that the spoon can be placed inside the bowl but the bowl cannot be placed inside the spoon. It is important to correct as many scene understanding errors as possible in robotics applications, since inappropriate actions taken on the basis of scene understanding errors can have real-world consequences (e.g., breaking an item in the kitchen).

Thus, the apparatus 400 may be a controllable autonomous or semi-autonomous apparatus for performing a task in an environment comprising at least two objects. In this case, the at least one image being captured may be an image of the environment, and the at least one processor may use the corrected processing result to control the controllable autonomous or semi-autonomous apparatus in the environment.

For example, the environment may be a home or kitchen, or other domestic, office or factory/warehouse environment, in which the controllable apparatus is performing a task, such as moving an object relative to another object.

The controllable apparatus may comprise at least one gripper, and the at least one processor may control the at least one gripper to interact with an object in the environment based on the corrected processing result.

For example, the controllable apparatus may place a spoon inside a bowl—in this example, the environment comprises at least the bowl and the spoon, both of which are objects in the environment. In this example, the controllable apparatus is controlled to move the bowl and the spoon relative to each other in a logically consistent manner.

The apparatus may further comprise a system for moving the apparatus through the environment. The at least one processor may control the system, to move the apparatus, based on the corrected processing result so that the apparatus does not bump into objects or try to move through solid objects.

FIG. 6 is a schematic diagram illustrating how the present method may be applied to another example graphical problem with logical constraints. This is related to Predicate Classification tasks which consist of predicting the right predicate between a set of objects (given input in the form of labeled and localized bounding boxes) in an image. The first ML model/Neuro-Solver 100 predicts a set of triples between the given objects (i.e. horse, person, hat, jacket, tail in the example image on the left hand side). The second ML model/Mask-Predictor 200 identifies the components that potentially violate domain rules (e.g. the predicate "in front" is not symmetric and the object "jacket" is not in the range of the predicate "riding"). Finally, the reasoning module/Symbolic-Solver 300 corrects the predictions.

In the example in FIG. 6, and referring to equation 1, $\mathcal{X}$ corresponds to the input images with the set of labeled bounding boxes. This can be vectorized in different ways using appropriate embedding techniques. $\mathcal{Y}$ is defined as ( $\mathcal{B} \times \{1, \ldots, m\} \times \mathcal{B}$ )$^k$ and corresponds to the set of solutions. A solution is a set of k triples with an object pair and a predicate between them (chosen within the set of m possible predicates). $\mathcal{B}$ is the space of all possible labeled bounding boxes and is defined as $\mathbb{R}^4 \times \{1, \ldots, n\}$ where n is the number of possible objects labels. $\mathcal{Z}$ is defined as $\{0,1\}^k$. The Hadamard product is intended between the predicate vector $p \in \{1, \ldots, m\}^k$ part of a solution $y \in (\mathcal{B} \times \{1, \ldots, m\} \times \mathcal{B})^k$ and the mask vector $m \in \{0,1\}^k$, since bounding boxes/labels are given in input. $\mathcal{Y}'$ is defined as ($\mathcal{B} \times \{0, \ldots, m\} \times \mathcal{B}$ )$^k$ and corresponds to the set of symbolic solutions $\mathcal{Y}$ augmented with the class 0 indicating the "empty" predicate (to be filled by the Symbolic-Solver). $\mathcal{R}$ is an ontology describing the set of object and predicates in the dataset. Some examples are type-rules constraining the domain and range of the predicates (e.g. the object cat is not in the domain of the predicate riding) or the symmetry/reflexivity rules (e.g. the predicate "in front" is not symmetric).

Another example use of the present techniques may include AR applications that create new user experiences by rendering virtual assets in the user's field of view in a way that matches the real scene being viewed. In the simplest case this involves estimating the ground plane of the floor in order to render a virtual object that appears to be on the floor. In more immersive cases it is needed to characterize the objects and relationships in the scene to plan the rendering. For example, if the goal is to render "a virtual character sitting and watching TV". An AI perception module is needed to produce a scene graph that includes at least:

which objects in the scene have the affordance "sittab-leOn"—in order to select semantically plausible locations for rendering (e.g., tables, chairs, couches. Not flowerpots), which sittable objects are currently empty—in order to avoid breaking the immersive experience by rendering a physically impossible VR avatar that overlaps another physical object or person, which empty and sittable objects are located in-front-of the TV in order to render the virtual character in an appropriate place for plausible TV viewing.

Errors in scene parsing at any of these steps will result in implausible rendering that breaks the immersive experience. The present error-correction system will ensure that minimum errors are passed from the perception module to the AR planning module.

In another example, the apparatus 400 may be a wearable augmented reality device for controlling virtual objects blended into a real-world environment comprising at least one real object. In this example, the at least one image being captured may be an image of the environment, and the at least one processor may use the corrected processing result to control virtual objects correctly with respect to the at least one real object. This may be useful so that the virtual objects correctly interact with the real-world object(s) and do not violate any physical rules of the real-world environment.

Figure 7A:
FIG. 7A schematic diagram illustrating how the present method may be used to solve a Visual Sudoku puzzle.
Figure 7B:
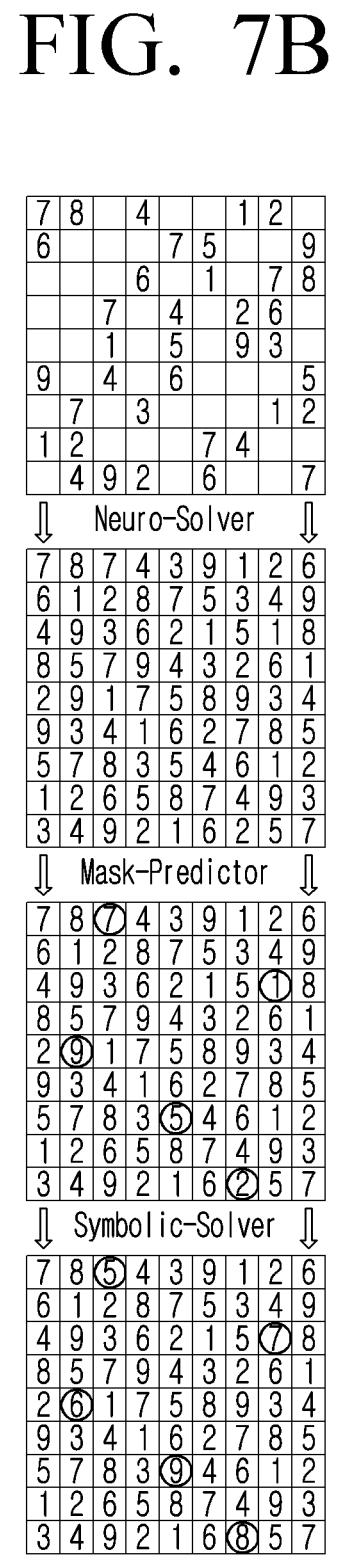

FIG. 7A shows another example use of the present techniques: visual Sudoku. In this case, the problem/task that is being solved using the present techniques is a logical problem, as the output is a logical formula. (Specifically, as explained below, the output is a logical formula that states the value of each cell of the Sudoku board). The pipeline shown in FIG. 7A shows how the first and second ML models and the reasoning module may be applied to this example task. FIG. 7B provides a visualisation of the inputs to and outputs of the different models and the reasoning module.

The visual Sudoku task consists of providing a complete Sudoku board $y \in \mathcal{Y}$ corresponding to the solution of an incomplete input board in the form of an image $\mathcal{X} \in \mathcal{X}$. $\mathcal{X}$ is defined as $[0,1]^{212 \times 212}$ and corresponds to the set of the images of a Sudoku board (each Sudoku cell has dimension 28×28). $\mathcal{Y}$ is defined as $\{1, \ldots, 9\}^{81}$ and corresponds to the set of symbolic solutions where each cell is one of the possible 9 Sudoku digits. $\mathcal{Z}$ is defined as $\{0,1\}^{81}$. $\mathcal{Y}'$ is defined as $\{0, \ldots, 9\}^{81}$ and corresponds to the set of symbolic solutions with the 9 possible Sudoku digits and the digit 0 indicating empty cells. $\mathcal{R}$ contains the Sudoku rules: each cell needs to be filled with numbers in $\{1, \ldots, 9\}$, without repeating any numbers within the row, column or block. These can be formalized in different ways, depending on the Symbolic-Solver choice. Standard implementations of the Sudoku rules exist, such as the ones provided by SWI-Prolog.

FIG. 8A shows information on the datasets used to conduct experiments on solving a visual Sudoku puzzle. Specifically, FIG. 8A is a table characterising the different datasets used for solving a visual Sudoku puzzle. A total of four 9×9 Sudoku datasets were considered. Three datasets were taken from a repository of symbolic Sudoku boards available online: 1) big_kaggle containing 100,000 puzzles. It is a subset of a bigger dataset containing 1 million boards hosted on Kaggle targeting ML models. These puzzles are quite easy with an average of 33.82 hints per board (between 29 and 37); 2) minimal_17 a complete or nearly-complete dataset of all 17-clue puzzles (which is the minimum number of hints in a minimal Sudoku board); and 3) multiple_sol containing 10,000 puzzles with two or more solutions. These symbolic datasets were converted into images using MNIST digits. Moreover, the Sudoku dataset released with SatNet (denoted as satnet_data in what follows) was considered. This contains 10,000 Sudoku boards (both in image and symbolic form) with an average number of hints equal to 36.22 (between 31 and 42).

The $D_{mp}$ datasets for the second ML model/Mask-Predictor were generated by introducing noise in the task instances in D: for each board y in the original dataset D a noisy board $y_n$ was generated by adding noise both in the hint cells (swapping some of the hints digits) as well as in the solution cells (swapping some of solution cells). These two sets were perturbed separately. For smaller datasets (e.g. satnet_data and multiple_sol) multiple masking boards were generated per original board: for each board y in the D k=10 noisy boards were generated $$y_n^1, y_n^2, \ldots, y_n^k.$$

The first ML model/Neuro-Solver is the first component of the pipeline and has the role of producing a full symbolic solution from a input image board. It takes in input an image $x_i \in \mathcal{X}$ and output a probability distribution over the set of possible complete Sudoku solution boards $\mathcal{Y} = \{1, \ldots, 9\}^{81}$. In the present implementation this module is divided in two sub-components: the Perception and the SolverNN.

The Perception parses an input image of an incomplete Sudoku board into a 81-dimensional symbolic vector with the input hints digits and 0s for the empty cells. In the present implementation it is a standard convolutional neural network (CNN) for MNIST digit recognition (with 2 convolutional layers) add citation. Each MNIST digit of the input image (corresponding to a single cell) is classified by the CNN independently.

The Perception model parses an input image of 252×252 into its symbolic representation of 9×9×(9+1). In the present implementation the Perception is a straightforward extension of the convolutional neural network (CNN) for single MNIST digit prediction (LeCun et al) to multi-digit prediction by applying the CNN to each patch of 28×28. Formally, the Perception has an output layer of 81 nodes returning a 10-dimensional (the 9 input hints digits and the class 0 for the empty cells) posterior distribution over the digits 0-9 for each input image $x_i \in \mathcal{X} = [0,1]^{252 \times 252}$ of an incomplete Sudoku board. The output is then a probability distribution over $\mathcal{Y}'\{0, \ldots, 9\}^{81}$. Each MNIST digit of the input image (corresponding to a single cell) is classified by the CNN independently (note that the digits are treated independently just for simplicity and that the image can be processed in its entirety without significantly changes to the overall pipeline). The Perception model is trained to minimize the negative log likelihood loss (with log softmax as output layer), and is optimized via the ADADELTA optimizer.

The SolverNN takes in input a partially filled 81-dimensional symbolic vector (corresponding to an incomplete Sudoku board) and solves it providing a full symbolic solution as output. In the present implementation it is a Transformer model with 4 multi-head attention modules. The Mask-predictor is a Transformer model, with the same specifications as the SolverNN, with the only difference of the number of output classes (only 1 class compared to the 9 classes of the SolverNN). The Symbolic solver takes in input a masked solution vector (the product of the output of the Neuro-Solver and the output of the Mask-predictor). Thus, it takes in input a partially filled 81-dimensional symbolic vector and solves it providing a full symbolic solution as output.

The SolverNN model takes as input a probability distribution over $\mathcal{Y}'=\{0, \ldots, 9\}^{81}$ the set of partially filled Sudoku boards and outputs a probabilistic solution belonging to the space $\mathcal{Y}=\{1, \ldots, 9\}^{81}$. In the present implementation SolverNN is a Transformer model with a linear layer mapping the input distribution (which is the output of the Perception) to 81 tokens/nodes of length 196, followed by 4 sequential self-attention blocks on top of these tokens; the input is positionally encoded to preserve the spatial information presented in the 9×9 Sudoku board (e.g the concepts of row, column, and 3×3 block). The output of the SolverNN is a probability distribution over the possible complete solutions $\mathcal{Y}=\{1, \ldots, 9\}^{81}$: 81 output nodes returning a 9-dimensional posterior distribution over the digits 1-9. The SolverNN model is trained to minimize the Binary Cross Entropy with logits loss, and is optimized via Adam optimizer with weight decay.

The second ML model/Mask-Predictor is a Transformer, with the same architecture and training loss as the SolverNN, with the only difference on the dimension of the output layer (1-dimensional). The Mask-Predictor takes in input a probability distribution over the set of complete solutions $\mathcal{Y}=\{1, \ldots, 9\}^{81}$, the output of the SolverNN model (81 nodes returning a 9-dimensional posterior distribution over the digits 1-9, that can also be the one-hot representation of completely filled Sudoku boards when trained alone and not in the pipeline) and outputs a probability distribution over $\mathcal{Z}=\{0,1\}^{81}$. For the Mask-Predictor, more weight is added to negative examples in the loss, since it is preferred to mask more cells, at the cost of masking correct ones, rather than non masking some of the errors in the SolverNN predictions. This is because, given that a non-probabilistic logic solver is being considered, a single error in the Symbolic-Solver input will make it fail.

The reasoning module/Symbolic-Solver takes in input a masked solution vector (the element-wise product of the output of the Neuro-Solver and the output of the Mask-Predictor) which is a partially filled 81-dimensional symbolic vector. The Symbolic-Solver will then attempt to solve it using the rules $\mathcal{R}$ providing a full symbolic solution vector as output. Two (non-probabilistic) Symbolic-Solvers are considered: 1) PySwip, a Python library to interface with SWI-Prolog, a reasoning engine for the Prolog programming language; 2) a brute force backtrack-based algorithm. A probabilistic Symbolic-Solver is unfeasible in this scenario due to the combinatorial nature of the possible Sudoku boards. Since a non-probabilistic Symbolic-reasoner is used, the hypothesis function corresponds to eq. 1 with an additional argmax (since the full probability distribution over the classes cannot be provided, but only the most probable value for each cell):

$$f_\theta(x)=sb(\arg\max(ns(x))\odot\arg\max(mp(ns(x))),\mathcal{R}). \qquad (2)$$

In the case in which an unsatisfiable neural prediction is given in input to the Symbolic-Solver, no solution is generated an thus the whole board is counted as wrong.

Two symbolic solvers are considered: 1) PySwip, a Python library to interface with SWI-Prolog, a reasoning engine for the Prolog programming language; 2) a brute force backtrack-based algorithm.

Learning Algorithm (and Reinforcement Learning). As mentioned above, reinforcement learning is used to refine the models connecting the whole pipeline together. The use of RL is required because the last component of the pipeline, the symbolic reasoner, is not differentiable.

As mentioned above the models are first trained in a fully supervised manner (details above) and then reinforcement learning (RL) is used to refine the pipeline end-to-end. RL scenario are defined as follows: The input state $y_t$ corresponds to a solution board provided by the Neuro-Solver (Perception+SolverNN). The action space corresponds to the set of all possible complete masking boards configurations $\mathcal{Z}=\{0,1\}^{81}$. Each action m coincides with the simultaneous execution of 81 independent sub-actions corresponding to the decision of masking or not a single cell in the solution board $y_t$. For each Sudoku board, an action $\tilde{m}\in\mathcal{Z}$ is sampled following the policy distribution. The final state $y_{t+1}$ corresponds to the solution board provided as output by the Symbolic-Solver (with input $\mathcal{R}$ and $y'_t=\arg\max(y_t)\odot\tilde{m}$). The action that is performed corresponds to the application of the masking over the solution board provided by the Neuro-Solver followed by the deterministic application of the Symbolic-Solver to the masked solution board.

In the case of Visual Sudoku the input state $s_t$ corresponds to a solution board provided by the Neuro-solver+Perception part of the pipeline. The action space corresponds to the set of all possible complete masking board configurations (the output of the Mask-Predictor). Each action coincides with 81 independent actions corresponding to the 81 cells $m_i$ in the masking board configuration m. Such an action is sampled for each Sudoku board. The final state $s_{t+1}$ corresponds to the solution board from the output of the symbolic solver. The action performed corresponds to the application of the masking over the solution board provided by the Neuro-solver and the deterministic application of the symbolic solver to the masked solution board.

The REINFORCE algorithm is used, with its standard policy loss. For each batch, the following applies:

$$\mathcal{L}(B;\theta)=-\sum_{x\in B}r\log P_\theta(m|x)=-\sum_{x\in B}\left(r\sum_{i=0}^{81}\log P_\theta(m_i|x)\right)$$

Only positive rewards are applied. Given an output board y' and its ground truth board y, two types of rewards with two different order of magnitude are considered: the main reward, $r_b\in\{0,10\}$, when the entire board is correct and a marginal reward $r_c\in[0,1]$ for each correct cell i.

$$r=r_b+r_c=10\cdot\delta_{y',y}+\frac{1}{81}\sum_{i=0}^{81}\delta_{y'_i,y_i}$$

The rewards are normalised to improve training stability, since each board difficulty can vary.

Symbolic Baseline: The Symbolic Baseline consists of executing the symbolic solver (PySwip) directly from the output of the Perception module (after applying the arg max operator). Another possibility would be adapting the prediction-correction part of the pipeline in the work of Giunchiglia et al. (2022a). Using a probabilistic reasoning engine (e.g. ProbLog) and using the whole (or partial, e.g. the top k candidates for each cell of the Sudoku board) output distribution of the Perception module as input is computationally unfeasible. The performance of the symbolic baseline is connected to the performance of the Perception module (given a correct input board, the symbolic solver always find the correct solution).

The present techniques are compared with two state-of-the-art models: SatNet, a differentiable MAXSAT solver that can be integrated into neural networks; and NeurASP, an extension of answer set programs that consider a neural network output as the probability distribution over atomic facts in answer set programs.

Moreover SatNet was introduced in the role of Neuro-solver in the present pipeline. Their architecture was connected to the present Mask-predictor and the Symbolic-solver. This new pipeline is denoted as SatNet+Our.

FIG. 8B shows a table of results from experiments to test the example use of FIG. 7A—the visual-Sudoku task. Specifically, the table shows the percentage of completely correct solution boards. (NeurASP was tested only on 200/ 5000 test images due to the long run-time (days)). The best results are in bold font. (The pipeline is underperforming on multiple_sol dataset likely due to the fact that each input board admits more than one solution but only one is provided at training.)

The main results can be summarized as follows: 1) the proposed pipeline outperforms the baseline in most of the cases (and never performs worst); 2) the performance of an existing method is improved by integrating it into the proposed pipeline; 3) the proposed pipeline is more efficient, compared to the other methods, in terms computational time vs. performance; and 4) the method is more robust to noise compared to the symbolic baseline.

FIG. 8B shows the performance of the proposed pipeline (with RL) on the different datasets compared with the different baselines. It can be seen that the proposed pipeline outperforms all the neuro-symbolic methods and in one instance matches the Symbolic Baseline (which is outperformed in all the other datasets). Note that symbolic baseline fails if even one digit is incorrectly recognised, and thus it is not noise robust. NASR can be integrated with SatNet by replacing the Neuro-Solver with SatNet. The results (Sat-Net+NASR) show that the soft constraints enforced by SatNet can be improved, sometimes substantially by injection of hard constraints via NASR.

FIG. 8C is a table showing results from experiments to test the example use of FIG. 7A, where results are given for each of the different modules (i.e. first and second ML model and reasoning module) of the pipeline. Performance of the pipeline is reported analszing each module separately. It can be seen that for more challenging datasets (e.g. minimal_17 with only 17 hints minimal Sudoku boards and multiple_sol with multiple solutions) the performance of the Neuro-Solver is very low. In particular, for the minimal_17 dataset this is even more evident, since the SolverNN cannot produce any completely correct solution board (only 60% of the solution cells is correct on average per board) and the Mask-Predictor identifies only 30% of the errors. RL is necessary to refine all the parts together.

Comparing FIG. 8B and FIG. 8C it can be observed that, as expected, the performance of the Symbolic Baseline corresponds to the performance (in terms of percentage of completely correct converted boards) of the Perception module. This is because, given the use of a non-probabilistic logic solver, a single perception error will make the reasoning module/Symbolic-Solver fail. The Symbolic baseline is thus not noise robust and finds datasets with more than the minimal number of hints harder to solve.

An ablation study was performed to verify the impact of the Mask-Predictor by substituting it with a simple heuristic. Neuro-Solver outputs were masked on the basis of confidence, with threshold set by grid search and Bayesian optimisation. The results in FIG. 6b show that while this can perform well (e.g. in big_kaggle) it is significantly worse compared to the proposed pipeline.

Figure 9A:
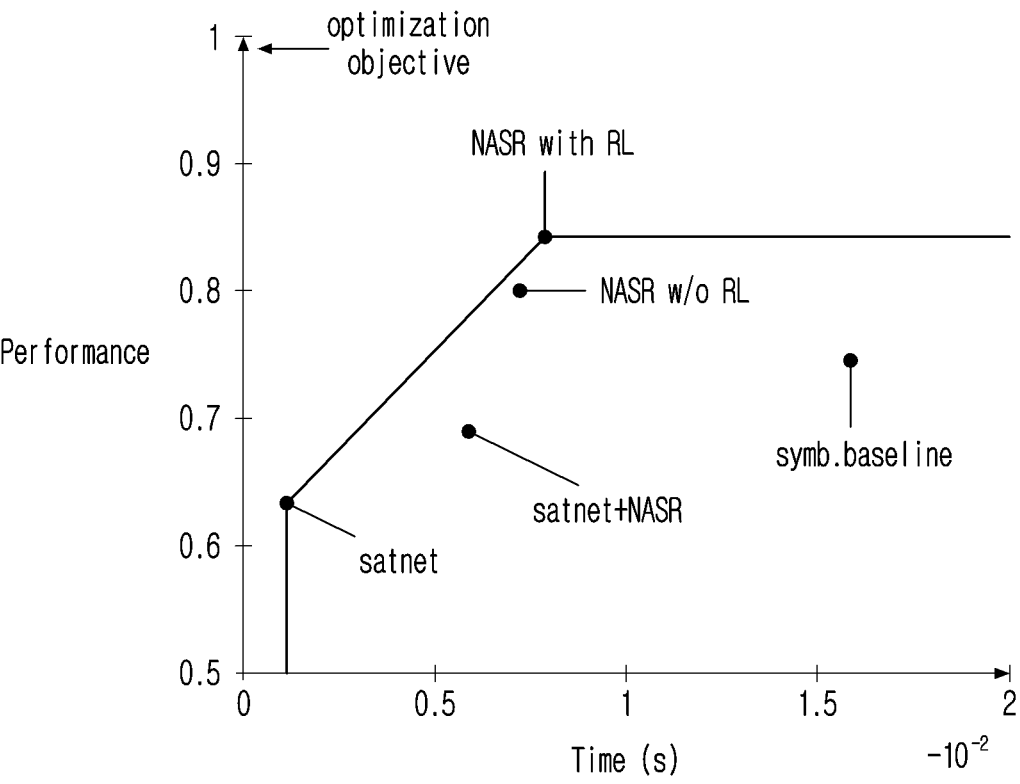
FIGS. 9A and 9B show experimental results conducted on the same task as in the example of FIG. 7A.
Figure 9B:
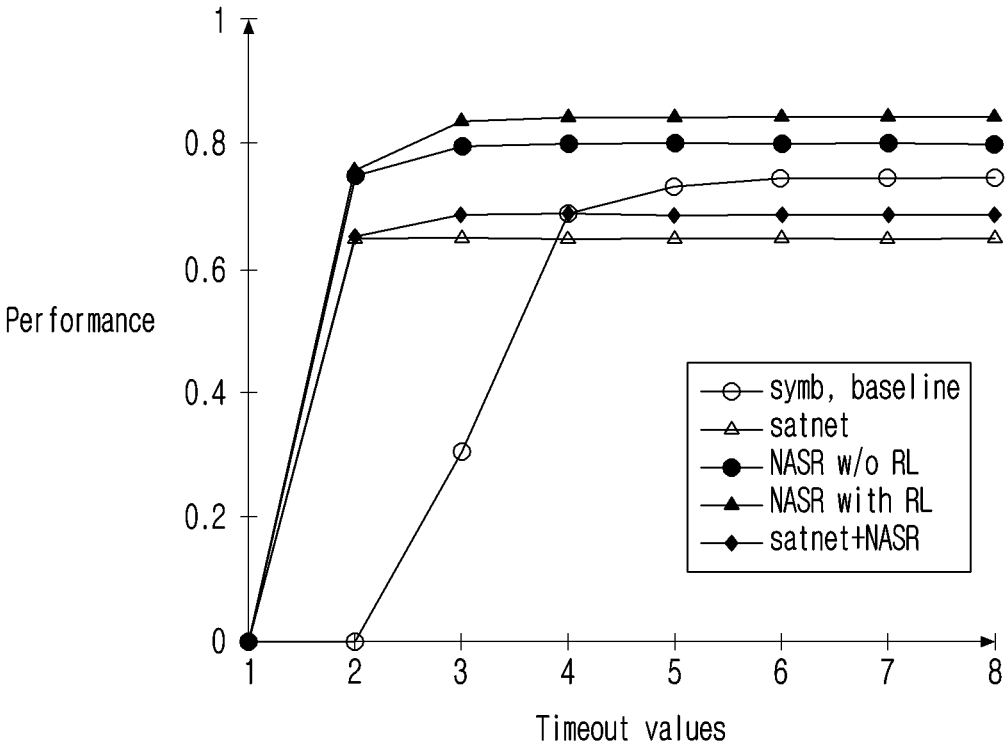

Time efficiency. The proposed pipeline is faster than the symbolic baseline (Perception+Symbolic Solver). This is because the Symbolic Solver needs to fill less empty cells and thus its search space is reduced. FIG. 9A is a graph showing how performance of the pipeline improves with time for experiments performed using the example of FIG. 7A, while FIG. 9B is a graph showing performance of the pipeline when computational time spent on the pipeline is limited for the example use of FIG. 7A. FIGS. 9A and 9B analyse the efficiency in terms of trade-off between the performance (percentage of completely predicted Sudoku boards), and computational time for the big_kaggle dataset.

FIG. 9A shows the Pareto front (purple line) considering the two optimization objectives of minimal computational time and maximal performance (percentage of completely correct boards). The proposed pipeline is always on the Pareto front and usually is the closest to the optimization objective (top left corner of the plot). FIG. 9B compares the performance (percentage of completely correct boards) of each method when limiting the computation time by different timeout values. It can be seen that with small timeout limits the neural models behave better compared to the Symbolic-Baseline which requires more time.

Figure 10:
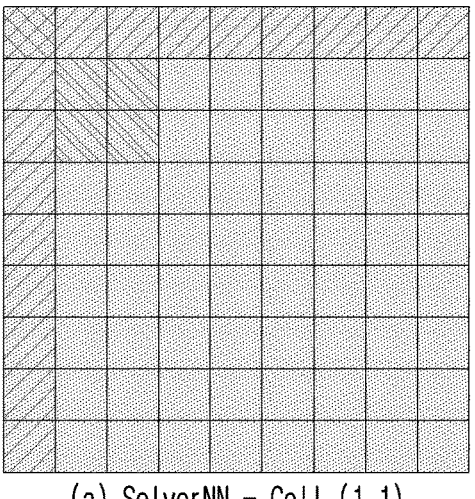
FIG. 10 shows attention maps resulting from experiments conducted using the same task as of FIG. 7A.
Figure 10:
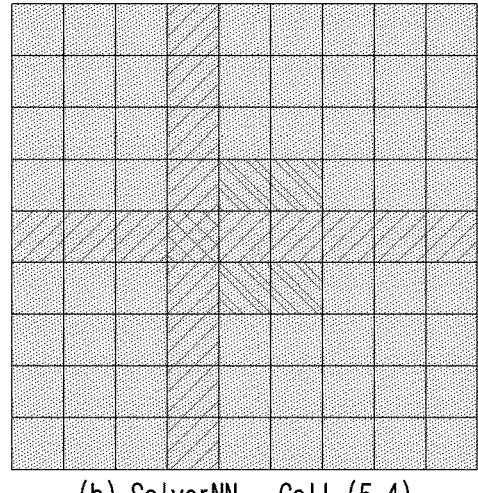
Figure 10:
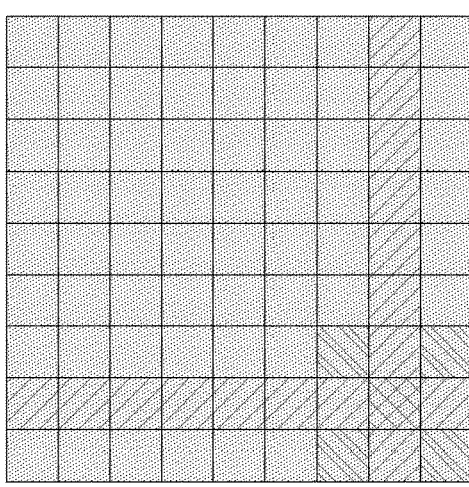
Figure 10:
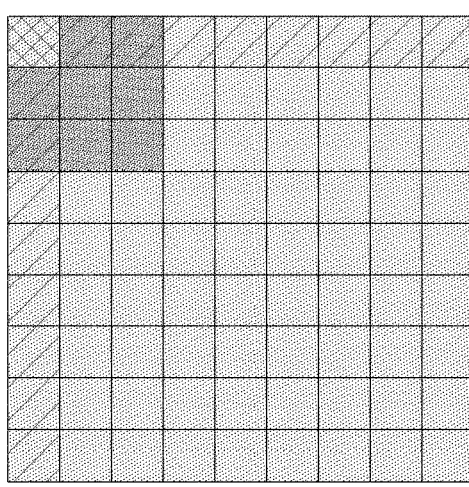
Figure 10:
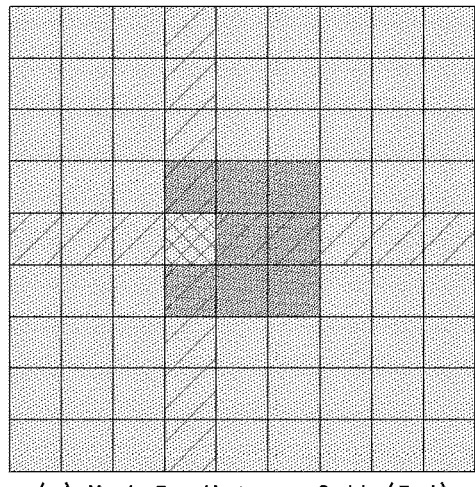
Figure 10:
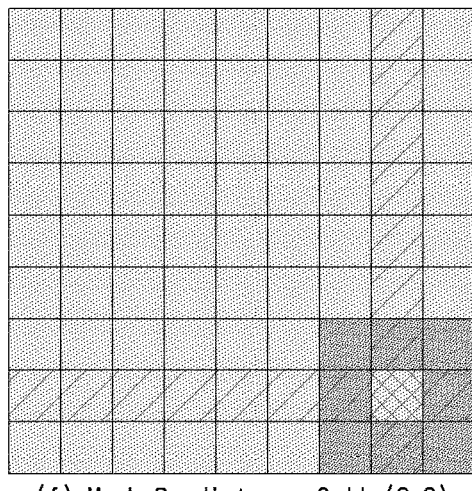

In FIG. 10, (a) to (f) show attention maps resulting from experiments conducted using the task of FIG. 7A. To better understand the Neuro-Solver and Mask-Predictor networks, their attention maps are analysed for evidence of learning the rules of visual Sudoku. FIGS. 10(a) to 10(f) show the average of all the attention layers for the SolverNN and for the Mask-Predictor on the big_kaggle and minimal_17 dataset respectively. It can be seen that for each cell, both the SolverNN and the Mask-Predictor consider the information in the row, the column and the 3×3 block, which corresponds to the 3 Sudoku rules. The results are clearer for the SolverNN on big_kaggle dataset compared to the Mask-Predictor on minimal_17 dataset due to the dataset size. It should be noted that attention maps depend on the dataset. In particular, if a dataset contains some bias (e.g. multiple_sol) from how it has been generated, the networks will try to exploit the biases (e.g. learning a relaxed version of the rules $\mathcal{R}$ or some simpler heuristic) instead of learning the proper Sudoku rules.

Robustness to noise and Time efficiency. In some cases (e.g. minimal_17 dataset) there is no significant boost in performance respect to the symbolic baseline. However there is an advantage in two aspects: 1) The time to solve the Sudoku board is faster using the present pipeline compared to using just a standard reasoning engine. This is because the symbolic engine has to fill less cells and thus the search space is smaller.

REFERENCES

SWI-Prolog: https://www.swi-prolog.org. Version: 8.3.3.
ProbLog: Luc De Raedt, Angelika Kimmig, and Hannu
  Toivonen. Problog: A probabilistic prolog and its application in link discovery. In Manuela M. Veloso (ed.),
  IJCAI 2007, Proceedings of the 20th International Joint 25      26

Conference on Artificial Intelligence, Hyderabad, India, Jan. 6-12, 2007, pp. 2462-2467, 2007. URL http://ijcai.org/Proceedings/07/Papers/396.pdf.

PySwip: Yüce Tekol and contributors. PySwip v0.2.10, 2020. URL https://github.com/yuce/pyswip.

Vampire prover: Alexandre Riazanov and Andrei Voronkov. The design and implementation of VAMPIRE. AI communications, 15(2, 3):91-110, 2002.

REINFORCE: Ronald J. Williams. Simple statistical gradient-following algorithms for connectionist reinforcement learning. Mach. Learn., 8(3-4):229-256, may 1992. ISSN 0885-6125. doi: 10.1007/BF00992696. URL https://doi.org/10.007/BF00992696.

Sudoku Datasets: https://github.com/t-dillon/tdoku

Kaggle: https://www.kaggle.com/datasets/bryanpark/sudoku minimal_17: https://web.archive.org/web/20131019184812if_/http://school.maths.uwa.edu.au/gordon/sudokumin.php SatNet: Po-Wei Wang, Priya L. Donti, Bryan Wilder, and Zico Kolter. Satnet: Bridging deep learning and logical reasoning using a differentiable satisfiability solver. In Proceedings of ICML'19, 2019. URL http://arxiv.org/abs/1905.12149.

MNIST: Yann LeCun and Corinna Cortes. MNIST handwritten digit database. 2010. URL http://yan.lecun.com/exdb/mnist/.

Giunchiglia et al. (2022a): Eleonora Giunchiglia, Mihaela Stoian, Salman Khan, Fabio Cuzzolin, and Thomas Lukasiewicz. Road-r: The autonomous driving dataset with logical requirements. In Machine Learning, 2022a.

NeurASP: Zhun Yang, Adam Ishay, and Joohyung Lee. Neurasp: Embracing neural networks into answer set programming. In Christian Bessiere (ed.), Proceedings of the Twenty-Ninth International Joint Conference on Artificial Intelligence, IJCAI-20, pp. 1755-1762. International Joint Conferences on Artificial Intelligence Organization, 7 2020. doi: 10.24963/ijcai.2020/243. URL https://doi.org/10.24963/ijcai.2020/243. Main track.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method for detecting and correcting an error in an output of a first trained machine learning, ML, model, the method comprising:

receiving, by a communication module, an input data item to be provided to the first trained machine learning, ML, model;

providing the input data item to the first trained machine learning, ML, model, processing the input data item using the first ML model, and outputting, from the first ML model, a processing result;

providing, through the communication module, the processing result to a second trained machine learning, ML, model trained to detect an error in the processing result, and outputting, from the second ML model, information on whether there is at least one error in the processing result;

generating a masked solution by nullifying components of the processing result identified as erroneous by the second ML model;

when the output of the second ML model indicates there is at least one error in the processing result, providing, through the communication module, the masked solution to a reasoning module, correcting, using the reasoning module, each nullified component of the masked solution, and outputting, from the reasoning module, a corrected processing result for the input data item; and jointly training the first ML model and the second ML model using the corrected processing result for the input data item.

2. The method as claimed in claim 1, wherein outputting a processing result from the first trained ML model comprises outputting a first vector, and wherein outputting information from the second trained ML model on whether there is at least one error in the processing result comprises generating a second vector that indicates, for each component of the first vector, whether an error is detected in that component.

3. The method as claimed in claim 2, wherein generating a masked solution comprises:

generating a third vector, when the second vector generated by the second ML model indicates there is at least one error in the processing result, by nullifying each component of the first vector when the second vector indicates an error in that component of the first vector.

4. The method as claimed in claim 3, wherein providing the masked solution in the processing result to a reasoning module comprises providing the third vector to the reasoning module; and wherein correcting each nullified component of the masked solution comprises outputting a fourth vector, from the reasoning module, comprising corrected values for each nullified component of the first vector.

5. The method as claimed in claim 3, wherein correcting each nullified component of the masked solution comprises determining a correction to the detected error using at least one predetermined constraint specific to a domain to which the input data item belongs.

6. The method as claimed in claim 3, wherein providing the input data item comprises providing an image to the first trained ML model, and wherein processing the input data item comprises:

extracting features from the image; and outputting a processing result using the extracted features.

7. The method as claimed in claim 6, wherein the image is an image of a scene depicting at least two objects, and outputting a processing result using the extracted features comprises outputting a scene graph showing a relationship between the at least two objects in the scene.

8. An apparatus for detecting and correcting an error in an output of a first trained machine learning, ML, model, the apparatus comprising:

a communication module; and at least one processor coupled to memory, and arranged for:

receiving, by the communication module, an input data item to be provided to the first trained machine learning, ML, model;

providing the input data item to the first trained machine learning, ML, model, processing the input data item using the first ML model, and outputting, from the first ML model, a processing result;

providing, through the communication module, the processing result to a second trained machine learning, ML, model trained to detect an error in the processing result, and outputting, from the second ML model, information on whether there is at least one error in the processing result;

generating a masked solution by nullifying components of the processing result identified as erroneous by the second ML model;

when the output of the second ML model indicates there is at least one error in the processing result, providing, through the communication module, the masked solution to a reasoning module, correcting, using the reasoning module, each nullified component of the masked solution, and outputting, from the reasoning module, a corrected processing result for the input data item; and jointly training the first ML model and the second ML model using the corrected processing result for the input data item.

9. The apparatus as claimed in claim 8, further comprising:

at least one image capture device for capturing an image;

wherein providing the input data item comprises providing an image to the first trained ML model, and wherein processing the input data item comprises extracting features from the image.

10. The apparatus as claimed in claim 9, wherein:

the apparatus is a controllable autonomous or semi-autonomous apparatus for performing a task in an environment comprising at least two objects, the image being captured is an image of the environment, and the at least one processor uses the corrected processing result to control the controllable autonomous or semi-autonomous apparatus in the environment.

11. The apparatus as claimed in claim 10, wherein the controllable apparatus comprises at least one gripper, and wherein the at least one processor controls the at least one gripper to interact with an object in the environment based on the corrected processing result.

12. The apparatus as claimed in claim 10, further comprising a system for moving the apparatus through the environment, wherein the at least one processor controls the system based on the corrected processing result.

13. The apparatus as claimed in claim 9, wherein:

the apparatus is a wearable augmented reality device for controlling virtual objects blended into a real-world environment comprising at least one real object, the image being captured is an image of the environment, and the at least one processor uses the corrected processing result to control virtual objects correctly with respect to the at least one real object.

14. A non-transitory computer-readable storage medium including a program executes a controlling method of a processor, the method comprising:

receiving, by a communication module, an input data item to be provided to the first trained machine learning, ML, model;

providing the input data item to the first trained machine learning, ML, model, processing the input data item using the first ML model, and outputting, from the first ML model, a processing result;

providing, through the communication module, the processing result to a second trained machine learning, ML, model trained to detect an error in the processing result, and outputting, from the second ML model, information on whether there is at least one error in the processing result;

generating a masked solution by nullifying components of the processing result identified as erroneous by the second ML model;

when the output of the second ML model indicates there is at least one error in the processing result, providing, through the communication module, the masked solution to into-a reasoning module, correcting, using the reasoning module, each nullified component of the masked solution, and outputting, from the reasoning module, a corrected processing result for the input data item; and jointly training the first ML model and the second ML model using the corrected processing result for the input data item.

15. A non-transitory computer-readable storage medium as claimed in claim 14, wherein outputting a processing result from the first trained ML model comprises outputting a first vector, and wherein outputting information from the second trained ML model on whether there is at least one error in the processing result comprises generating a second vector that indicates, for each component of the first vector, whether an error is detected in that component.

16. A non-transitory computer-readable storage medium as claimed in claim 15, wherein generating a masked solution comprises:

generating a third vector, when the second vector generated by the second ML model indicates there is at least one error in the processing result, by nullifying each component of the first vector when the second vector indicates an error in that component of the first vector.

17. A non-transitory computer-readable storage medium as claimed in claim 16, wherein providing the masked solution to a reasoning module comprises providing the third vector to the reasoning module; and wherein correcting each nullified component of the masked solution comprises outputting a fourth vector, from the reasoning module, comprising corrected values for each nullified component of the first vector.

18. A non-transitory computer-readable storage medium as claimed in claim 16, wherein correcting each nullified component of the masked solution comprises determining a correction to the detected error using at least one predetermined constraint specific to a domain to which the input data item belongs.

19. A non-transitory computer-readable storage medium as claimed in claim 16, wherein providing the input data item comprises providing an image to the first trained ML model, and wherein processing the input data item comprises:

extracting features from the image; and outputting a processing result using the extracted features.

20. A non-transitory computer-readable storage medium as claimed in claim 19, wherein the image is an image of a scene depicting at least two objects, and outputting a processing result using the extracted features comprises outputting a scene graph showing a relationship between the at least two objects in the scene.

* * * * *